(12) United States Patent
Wetzel et al.

(10) Patent No.: US 6,474,963 B1
(45) Date of Patent: Nov. 5, 2002

(54) PISTON PUMP HAVING A HOLLOW PISTON

(75) Inventors: Gerhard Wetzel, Korntal-Muenchingen; Wolfgang Schuller, Sachsenheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,113

(22) PCT Filed: Mar. 4, 2000

(86) PCT No.: PCT/DE00/00704
§ 371 (c)(1),
(2), (4) Date: Mar. 26, 2001

(87) PCT Pub. No.: WO00/65234
PCT Pub. Date: Nov. 2, 2000

(30) Foreign Application Priority Data

Apr. 25, 1999 (DE) .......................................... 199 18 122

(51) Int. Cl.⁷ ............................................... F04B 39/10
(52) U.S. Cl. ........................ 417/549; 417/470; 417/549; 417/554; 417/555.1
(58) Field of Search ................................. 417/470, 549, 417/554, 555.1

(56) References Cited

U.S. PATENT DOCUMENTS

| RE28,880 E | * | 6/1976 | Farrow ........................ 417/466 |
| 5,823,639 A | * | 10/1998 | Zinnkann et al. ......... 303/116.4 |
| 6,302,663 B1 | * | 10/2001 | Schuller et al. ............. 417/470 |

FOREIGN PATENT DOCUMENTS

| GB | 0027717 | * | 10/1980 | .................. 417/470 |
| IT | 0617200 | * | 3/1994 | .................. 417/470 |

* cited by examiner

Primary Examiner—Cheryl J. Tyler
Assistant Examiner—Emmanuel Sayoc
(74) Attorney, Agent, or Firm—Ronald E. Greigg

(57) ABSTRACT

The invention relates to a piston pump (10) for a hydraulic slip-controlled vehicle brake system. In order to reduce a structural length of the piston pump (10), the invention proposes embodying the piston (16) of the piston pump (10) as a hollow piston whose inner chamber constitutes a displacement chamber (40) of the piston pump (10) and inserting an inlet valve (20) of the piston pump (10) into the inner chamber of the piston (16).

13 Claims, 2 Drawing Sheets

PISTON PUMP HAVING A HOLLOW PISTON

CROSS-REFERENCE TO RELATED APPLICATIONS

This application is a 35 USC 371 application of PCT/DE 00/00704 filed on Mar. 4, 2000.

PRIOR ART

The invention relates to a piston pump which is provided for use in a slip-controlled hydraulic vehicle brake system.

Piston pumps of this kind are known in and of themselves. The known piston pumps have a cylindrical piston which is guided so that it can move axially in a pump bore in a pump housing and can be driven to execute a reciprocating stroke motion by means of a cam which can be driven to rotate in particular by means of an electric motor. In the projection of the piston, a displacement chamber of the piston pump adjoins the end of the piston remote from the cam. By means of its reciprocating stroke motion, the piston alternatingly compresses and expands a volume of the displacement chamber in the pump bore, which is defined by an end face of the piston.

The known piston pumps have the disadvantage that they are large, in particular long, and as a result of this, take up a large amount of installation space.

ADVANTAGES OF THE INVENTION

In the piston pump according to the invention, the piston is embodied as a hollow piston and an inner chamber of the hollow piston constitutes a displacement chamber of the piston pump. The piston can, for example, be embodied as a hollow cylinder and can be embodied as closed at one end with a radial wall, in particular an end wall. The invention's relocation of the displacement chamber inside the piston reduces the structural length of the piston pump; the piston pump is compact in structure and requires little space. In order to further shorten the structural length or further reduce the amount of space occupied by the piston pump, a valve, which controls the through flow direction of the fluid to be supplied by the piston pump, is disposed in the inner chamber of the piston. As a result, the valve does not require any space outside the piston. In particular, the valve is an inlet valve or outlet valve of the piston pump; it is preferably embodied as a springless or spring-loaded check valve. A valve seat part, which contains a valve seat of the valve, is affixed inside the piston.

In one embodiment of the invention, an intermediary space between a piston wall of the hollow piston and the valve seat part constitutes a fluid opening for allowing fluid to travel into or out of the displacement chamber. The intermediary space can be embodied to as annular by means of a smaller outer dimension of the valve seat part in comparison to an inner dimension of the hollow piston. The intermediary space can also be constituted by axial grooves in the circumference and radial grooves in an end face of the valve seat part which, together with the hollow piston, constitute fluid conduits. This embodiment of the invention permits a simple and inexpensive design of the fluid inlet or fluid outlet.

The piston pump according to the invention is particularly provided as a pump in a brake system of a vehicle and is used in the control of pressure in wheel brake cylinders. The abbreviations ABS, ASR, VDC, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid from a storage tank into a wheel brake cylinder or a plurality of wheel brake cylinders (ASR, VDC, or EHB). The pump is required, for example, in a brake system with wheel slip control (ABS or ASR) and/or a brake system serving as a steering aid (VDC) and/or an electrohydraulic brake system (EHB). With wheel slip control (ABS or ASR), for example, a locking of the wheels of the vehicle during a braking event when there is strong pressure on the brake pedal (ABS) and/or a spinning of the driven wheels of the vehicle when there is strong pressure on the gas pedal (ASR) can be prevented. In a brake system that serves as a steering aid (VDC), a brake pressure is built up in one or more wheel brake cylinders independently of an actuation of the brake pedal or gas pedal, for instance to prevent the vehicle from breaking out of the path desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

BRIEF DESCRIPTION OF THE DRAWINGS

The invention will be explained in detail below in conjunction with two preferably selected exemplary embodiments shown in the drawings.

DESCRIPTION OF THE FIRST EXEMPLARY EMBODIMENT

Figure 1:
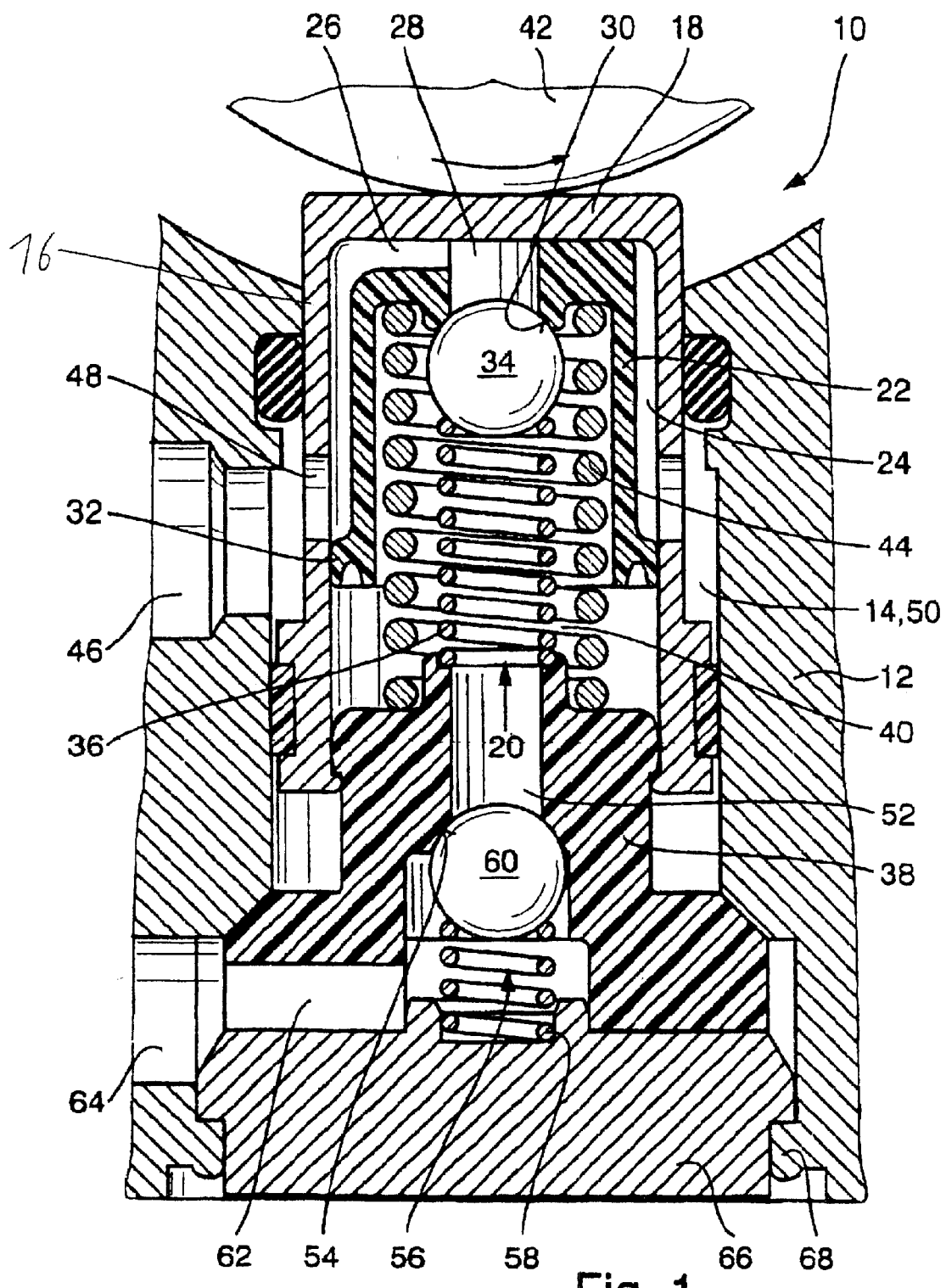
FIG. 1 is an axial section through a first exemplary embodiment of a piston pump according to the invention.

The piston pump 10 according to the invention shown in FIG. 1 is inserted into a hydraulic block 12 which constitutes a pump housing and will be referred to as such below. For the sake of a clarity, only a fraction of the hydraulic block 12 surrounding the piston pump 10 is shown in the drawing. The hydraulic block 12 is part of a hydraulic brake pressure control circuit of a slip-regulated vehicle brake system. In addition to the piston pump 10, other hydraulic components, not shown, such as solenoid valves are inserted into the hydraulic block 12 and are connected to one another and to the piston pump 10.

A stepped pump bore 14, in which a piston 16 is contained so that it can move axially, is let into the hydraulic block 12 that constitutes the pump housing. The piston 16 is embodied as a hollow piston; it is tubular and with a piston end wall 18, which is of one piece with the piston 16 and closes the piston 16 at one end. The other end of the piston 16 is open. The piston 16 is produced by means of non-cutting shaping, for example by means of cold forming, extrusion, or deep drawing.

An inlet valve 20 of the piston pump 10 is accommodated in the inner chamber of the piston 16. The inlet valve 20 is embodied as a spring-loaded check valve. The inlet valve 20 has a cup-shaped valve seat part 22, which is inserted into the piston 16 with a closed end resting against the inside of the piston end wall 18. The valve seat part 22 has a smaller outer diameter than an inner diameter of the piston 16 so that an annular intermediary space (annular chamber) 24 is produced between the valve seat part 22 and the piston 16. At one end face, the valve seat part 22 is provided with three grooves arranged in a star shape, which constitute fluid conduits 26 together with the piston end wall 18, which communicate with the annular chamber 24. The fluid conduits 26 feed into an axial center hole 28 in the valve seat part 22, wherein an opening of the center hole 28 on the inside of the valve seat part 22 is embodied as a conical valve seat 30 of the inlet valve 20 of the piston pump 10. At an open end, the valve seat part 22 has a circumferential, outwardly protruding sealing lip 32 with which it rests against the piston 16 in a sealed fashion. The sealing lip 32 closes the annular chamber 24 at the open end of the valve seat part 22. The inlet valve 20 has a valve ball 34 as a valve closing body, which is pressed against the valve seat 30 by a helical compression spring that functions as a valve closing spring 36.

The valve closing spring 36 is supported against an outlet valve part 38 which is embodied as pin-shaped, with a radially protruding annular collar at one end. The outlet valve part 38 is affixed in the pump bore 14 in a stationary fashion and protrudes into the inner chamber of the piston 16. The inner chamber of the piston 16, which is defined at the open end of the piston 16 by the outlet valve part 38 protruding into the piston 16, constitutes a displacement chamber 40 of the piston pump 10.

An inlet of fluid into the displacement chamber 40 of the piston pump 10 occurs through an inlet bore 46, which is let into the pump housing 12 and feeds into the pump bore 14. Fluid flowing in through the inlet bore 46 travels through the pump bore 14 and fluid openings 48, which are let into a circumferential wall of the piston, into the annular chamber 24 between the piston 16 and the valve seat part 22 of the inlet valve 20. The fluid flows out of the annular chamber 24 through the fluid conduits 26 in the vicinity of the piston end wall 18, into the center hole 28 of the valve seat part 22, and through the inlet valve 20 into the displacement chamber 40.

In order to drive the piston 16 into an axially reciprocating stroke motion in the pump bore 14, the piston pump 10 has a cam 42, which can be driven to rotate by an electric motor and whose outer circumference the piston 16 rests against with its piston end wall 18. A piston restoring spring 44 in the form of a helical compression spring inserted into the displacement chamber 40 presses the piston 16 against the circumference of the cam 42 and thus holds the piston 16 in contact with the cam 42. The piston restoring spring 44 rests in the valve seat part 22; it holds the valve seat part 22 against the piston end wall 18 and by means of the valve seat part 22, presses the piston 16 against the cam 42. The piston restoring spring 44 is supported against the stationary outlet valve part 38 in the pump bore 14. The reciprocating stroke motion of the piston 16 causes a volume of the displacement chamber 40 to expand and contract, as a result of which fluid is fed by the piston pump 10 in an intrinsically known fashion.

The piston 16 is embodied as a stepped piston, i.e. in the vicinity of its upper end it is sealed in the pump bore 14 along a larger diameter than at its closed end. Its embodiment as a stepped piston produces an annular chamber 50, which encompasses the piston 16 in the pump bore 14 and whose volume changes with the stroke motion of the piston 16. The volume of the annular chamber 50 increases during a delivery stroke of the piston 16 while the volume of the displacement chamber 40 decreases so that fluid contained in the displacement chamber 40 is displaced and is fed in this manner.

The expansion of the annular chamber 50 encompassing the piston 16 produces an aspiration of fluid through the inlet bore 46. With the return stroke of the piston 16, the volume of the annular chamber 50 decreases and at the same time the volume of the displacement chamber 40 increases, wherein the volume increase of the displacement chamber 40 is greater than that of the annular chamber 50. As a result, even during the return stroke of the piston 16, fluid is aspirated through the inlet bore 46 and flows into the displacement chamber 40 through the inlet valve 20 that is open during the return stroke. The embodiment of the piston 16 as a stepped piston produces an aspiration of fluid through the inlet bore 46 during both the delivery stroke and the return stroke of the piston 16, the aspiration of the piston pump 10 becomes more uniform, and a filling of the displacement chamber 40 as well as an efficiency of the piston pump 10 are improved.

The outlet of fluid from the displacement chamber 40 passes through an axial through opening 52 in the outlet valve part 38. The through opening 52 widens out with a conical annular step 54 which constitutes a valve seat of an outlet valve 56 of the piston pump 10. The outlet valve 56 is embodied as a spring-loaded check valve. It has a helical compression spring as a valve closing spring 58, which presses a valve ball 60 as a valve closing body against the valve seat 54. Fluid displaced from the displacement chamber 40 flows out of the through opening 52 through three radial conduits 62 let into the outlet valve part 38 in the shape of a star and travels into an outlet bore 64 which is let into the pump housing 12 radial to the pump bore 14.

At an end remote from the cam 42, the pump bore 14 is closed by a disk-shaped stopper part 66, which is secured in the pump bore 14 in a pressure-tight manner by means of a circumferential caulking 68 of the pump housing 12 and secures the outlet valve part 38 in the pump bore 14 in a stationary fashion.

DESCRIPTION OF THE SECOND EXEMPLARY EMBODIMENT

In order to avoid repetition, only the differences of FIG. 2 in comparison to FIG. 1 will be addressed below and otherwise, reference will be made to the preceding explanations in religion to FIG. 1; parts which are the same are provided with the same reference numerals.

Figure 2:
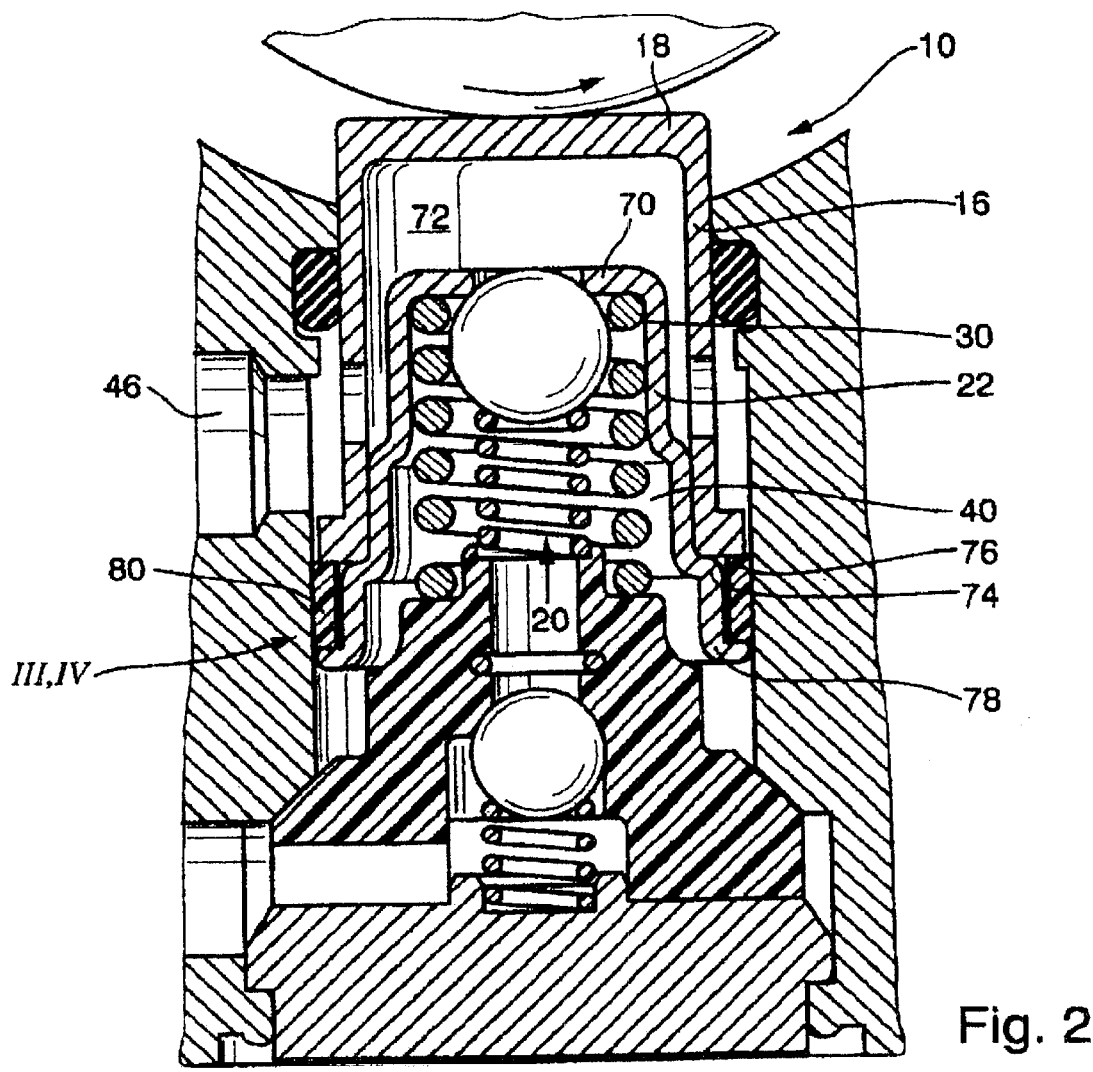
FIG. 2 is an axial section through a second exemplary embodiment of a piston pump according to the invention.

In the piston pump 10 according to the invention shown in FIG. 2, the valve seat part 22 of the inlet valve 20 is produced by means of non-cutting shaping, for example by means of cold forming, extrusion, or deep drawing. The valve seat part 22 is cup-shaped and has steps in its diameter. It is press-fitted into the open end of the piston 16, which is embodied as a hollow body. The valve seat 30 of the inlet valve 20 is stamped, which increases its resistance to wear.

Between an end wall 70 of the valve seat part 22 and the piston end wall 18, there is an intermediary space which, in addition to its function of conveying fluid from the inlet bore 46 to the inlet valve 20, also functions as a damper chamber 72. The damper chamber 72 damps pressure pulsations produced by means of the oscillating body type of the piston pump 10 and reduces pressure peaks. The damper chamber 72 improves the filling of the displacement chamber 40 and increases the efficiency of the piston pump 10. An intrinsically known damper body, not shown, made of an elastic material can be inserted into the damper chamber 72.

A press-fitting depth of the valve part 22 into the piston 16 is limited by an annular step 74 of the valve seat part 22 with which the valve seat part 22 rests against an annular piston end face 76 at the open end of the piston 16. The annular piston end face 76 protrudes radially outward beyond the annular step 74. The valve seat part 22 protrudes axially from the piston 16 and ends spaced axially apart from the annular piston end face 76 with an outward protruding flange 78. The flange 78 constitutes one flank of a circumferential groove which is axially defined by the annular piston end face 76 and the flange 78 and whose bottom is constituted by the section of the valve seat part 22 protruding axially from the piston 16. A sealing and guiding ring 80 with a rectangular annular cross section rests in this groove. The sealing and guiding ring 80 is placed onto the valve seat part 22 before the valve seat part 22 is press-fitted into the piston 16; the sealing and guiding ring 80 is therefore not stretched when it is affixed to the piston 16.

Figure 3:
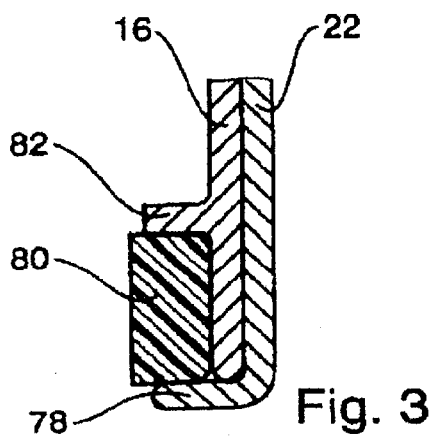
FIGS. 3 and 4 show details of two modified embodiments of the piston pump according to the invention from FIG. 2.
Figure 4:
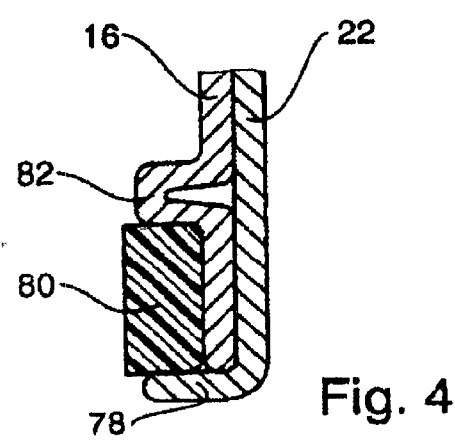

FIGS. 3 and 4 show two additional possible embodiments of the groove for the sealing and guiding ring 80. In both instances, the sealing and guiding ring 80 is placed against the free end of the circumference wall of the piston 16 and is axially secured by the flange 78 of the valve seat part 22. In the embodiments in FIGS. 3 and 4, the valve seat part 22 rests against the free end face of the piston 16 with its flange 78 and not with the annular step 74. Spaced apart from its free end, the piston 16 has an outwardly protruding collar 82 which axially secures the sealing and guiding ring 80. In the exemplary embodiment of the invention shown in FIG. 3, the collar 82 is produced in a cutting fashion by means of turning and in FIG. 4, the collar 82 is constituted by a circumferential fold produced by means of a compression of the piston 16.

The foregoing relates to preferred exemplary embodiment of the invention, it being understood that other variants and embodiments thereof are possible within the spirit and scope of the invention, the latter being defined by the appended claims.

What is claimed is:

1. A piston pump with a piston that can be driven to execute a reciprocating stroke motion, characterized in that the piston (16) is hollow, having an inner chamber which constitutes a displacement chamber (40) of the piston pump (10), and that a valve (20) is accommodated inside the piston (16) and controls the flow direction of fluid to be supplied by the piston pump (10), wherein a valve seat part (22) of the valve (20) is accommodated inside the piston (16), the piston is formed with an end wall (18) and a side cylindrical wall, and the side cylindrical wall of the piston has a fluid opening (48), and that between the valve seat part (22) and the hollow piston (16), an intermediary space (24) is formed, which intermediary space communicates with the fluid opening (48) in the side cylindrical wall of the piston and also communicates with the displacement chamber (40) via the valve (20).

2. The piston pump according to claim 1, characterized in that the valve (20) is a check valve.

3. The piston pump according to claim 1, characterized in that the piston (16) is of circular cylindrical shape, and the external diameter of the piston (16) is stepped to at least two different diameters.

4. The piston pump according to claim 1, characterized in that the piston (16) is formed by a shaping process other than removal of material.

5. A piston pump according to claim 1, characterized in that the valve seat part (22) is formed by a shaping process other than removal of material.

6. The piston pump according to claim 1, characterized in that the piston has an annular end face (76), and the valve seat part (22) has a flange (78) spaced axially apart from the annular piston end face (76) so as to form a circumferential groove between them, which groove contains a sealing ring (80) positioned therein.

7. The piston pump of claim 1, wherein the valve (20) has a valve seat part (22).

8. The piston pump of claim 7, wherein the valve seat part (22) has a center hole (28) and a valve closing member (34).

9. The piston pump of claim 9, wherein the valve seat part (22) has a portion that is smaller in diameter than the internal diameter of the hollow piston (16) so that an annular chamber is formed between the smaller portion of the valve seat part (22) and the inside of the hollow piston (16).

10. The piston pump of claim 9, wherein the valve seat part (22) has conduits (26) that communicate from the annular chamber to the center hole (28).

11. The piston pump of claim 10, wherein the piston (16) is stepped so as to have two different external diameters, one portion of the piston thus having an external diameter which is smaller that the other portion, and the piston (16) is placed within a bore (14) of a pump housing (12), and the external diameter of the smaller portion is smaller than the diameter of the bore (12) so as to form a second annular chamber between the bore and the smaller portion.

12. The piston pump of claim 1, wherein the piston is placed within a bore (14) of a pump housing (12), and there is a seal means positioned between the external surface of the piston (16) and the bore (14).

13. A piston pump with a piston that can be driven to execute a reciprocating stroke motion, characterized in that the piston (16) is hollow, having an inner chamber which constitutes a displacement chamber (40) of the piston pump (10), and that a valve (20) is accommodated inside the piston (16) and controls the flow direction of fluid to be supplied by the piston pump (10), wherein a valve seat part (22) of the valve (20) is accommodated inside the piston (16), wherein the piston (16) is stepped so as to have two different external diameters, one portion of the piston thus having an external diameter which is smaller that the other portion, and the piston (16) is placed within a bore (14) of a pump housing (12), and the external diameter of the smaller portion is smaller than the diameter of the bore (12) so as to form a second annular chamber between the bore and the smaller portion, and wherein as the piston (16) makes a stroke that forces fluid out of the displacement chamber (40), the second annular chamber aspirates fluid into itself.

* * * * *

UNITED STATES PATENT AND TRADEMARK OFFICE
CERTIFICATE OF CORRECTION

PATENT NO.      : 6,474,963 B1
DATED           : November 5, 2002
INVENTOR(S)     : Gerhard Wetzel et al.

It is certified that error appears in the above-identified patent and that said Letters Patent is hereby corrected as shown below:

<u>Title page,</u>
Item [30], should read as follows:
-- [30]  Foreign Application Priority Data:
           April 22, 1999  (DE)   ………………….. 1 99 18 122 --

Signed and Sealed this

Twenty-fifth Day of February, 2003

JAMES E. ROGAN
*Director of the United States Patent and Trademark Office*